US005462363A

United States Patent [19]
Brinkman

[11] Patent Number: 5,462,363
[45] Date of Patent: Oct. 31, 1995

[54] SCROLLER ROLLER BAND DEVICE

[76] Inventor: Erik J. Brinkman, c/o Andrew Ross, No. 9-626 Esquimalt Rd., Victoria, B.C., Canada, V9A-3L4

[21] Appl. No.: 278,145

[22] Filed: Jul. 21, 1994

[51] Int. Cl.⁶ .................... F16C 32/00; F16C 43/00
[52] U.S. Cl. .................. 384/91; 29/898.04; 384/129; 384/627
[58] Field of Search .................. 384/2, 50, 91, 384/103, 129, 441–444, 461, 627; 74/89.2; 29/898.04

[56] References Cited

U.S. PATENT DOCUMENTS

| | | | |
|---|---|---|---|
| 3,452,175 | 6/1969 | Wilkes | 200/153 |
| 3,567,881 | 3/1971 | Duimstra et al. | 200/61.53 |
| 3,586,457 | 6/1971 | Geary | 415/36 |
| 3,592,069 | 7/1971 | Welch | 74/89.2 |
| 3,606,795 | 9/1971 | Simons | 384/303 X |
| 3,613,975 | 10/1971 | Knight | 226/25 |
| 3,617,669 | 11/1971 | Maloney | 200/153 R |
| 3,641,296 | 2/1972 | Schwarz | 200/153 R |
| 3,643,048 | 2/1972 | Crow et al. | 200/153 R |
| 3,643,049 | 2/1972 | Lu Conic et al. | 200/153 R |
| 3,651,291 | 3/1972 | Bluem | 200/67 DA |
| 3,651,878 | 3/1972 | Cooley | 177/230 |
| 3,667,394 | 6/1972 | Lewis | 102/78 |
| 3,672,325 | 6/1972 | Harrah | 116/70 |
| 3,686,597 | 8/1972 | Harley et al. | 335/230 |
| 3,688,063 | 8/1972 | Bell | 200/61.53 |
| 3,688,578 | 9/1972 | Friestad | 73/313 |
| 3,691,871 | 9/1972 | Gladow et al. | 74/798 |
| 3,693,666 | 9/1972 | Avery | 137/57 |
| 3,698,351 | 10/1972 | Harrah et al. | 116/70 |
| 3,715,535 | 2/1973 | Urenda | 200/61.53 |
| 3,726,313 | 4/1973 | Pandya | 137/609 |
| 3,749,863 | 7/1973 | Kaiser | 200/61.45 R |
| 3,828,615 | 8/1974 | O'Connor | 74/89.22 |
| 3,848,695 | 11/1974 | Lacaze, Jr. | 180/103 |
| 3,850,043 | 11/1974 | Tarbox | 74/89.2 |
| 3,852,890 | 12/1974 | Locklair et al. | 33/366 |

(List continued on next page.)

OTHER PUBLICATIONS

*Sanda Technology Transfer Lab News*, Jun. 16, 1989, "Rolamite Applications are Few, But New Uses May Be Found" (6 page article).
*Popular Mechanics*, Feb. 1968, "The Amzaing Rolamite—It Opens The Door For 100 Inventions"(pp. 92–95, 210).
*Newsweek*, Oct. 23, 1967, "As Basic As The Wheel" (p. 91).
*Scientific American*, "Low–Friction Rollers", 1967 (p. 58). Dec. 1967.
*Popular Science*, "'Frictionless' Machines From Rollers and Bands", H. Walton; Mar., 1968 (pp. 96–97).
*Business Week*, "A Minimum of Friction", Oct. 21, 1967 (p. 52).
*Aerospace Technology*, "'Rolamite' Seen As Important Mechanical Design Technique", Oct. 23, 1967 (pp. 48, 49).
ROLAMITE Lab Report: ROLAMITE: A New Mechanical Design Concept, D. F. Wilkes, Dec. 1967, pp. 1–216.
*Science News*, "The Rolamite: A New Mechanism", Oct. 28, 1967, vol. 92, pp. 415–417.

Primary Examiner—Thomas R. Hannon
Attorney, Agent, or Firm—Nixon & Vanderhye

[57] ABSTRACT

A rotary roller band device having a central roller disposed within a cluster of orbiting rollers and rows of flexible bands holding the rollers together in a self-supporting structure. The bands are intertwined between the rollers such that as the rollers rotate the bands loop around and between the rollers. The bands engage each of the rollers in a low friction rolling contact that does not require lubrication. The bands each form a C-shaped loop. The central roller is cupped inside the C of each band loop such that the outer surface of each band contacts with the surface of the central roller. The orbiting rollers are concentrically arranged around the central roller and rotate counter to the central roller. Each of the orbiting rollers is disposed inside of the loop of each band such that the outer orbiting rollers engage the inner surface of each band.

23 Claims, 3 Drawing Sheets

U.S. PATENT DOCUMENTS

| | | | |
|---|---|---|---|
| 3,855,860 | 12/1974 | Rhoades | 73/243 |
| 3,859,488 | 1/1975 | Jones | 200/153 |
| 3,865,231 | 2/1975 | Ouska | 198/220 CA |
| 3,932,045 | 1/1976 | Hillberry et al. | 403/121 |
| 3,955,430 | 5/1976 | Rhoads | 74/89.2 |
| 3,967,135 | 6/1976 | Balban et al. | 307/121 |
| 3,973,582 | 8/1976 | Siebold | 137/202 |
| 4,034,606 | 7/1977 | Wierzbicki et al. | 73/208 |
| 4,056,292 | 11/1977 | Traut | 384/50 |
| 4,092,926 | 6/1978 | Bell | 102/204 R |
| 4,116,132 | 9/1978 | Bell | 102/200 |
| 4,167,276 | 9/1979 | Bell et al. | 280/731 |
| 4,348,559 | 9/1982 | Chu | 200/11 R |
| 4,380,692 | 4/1983 | Blanchard et al. | 200/61.45 R |
| 4,438,983 | 3/1984 | Davis | 384/2 |
| 4,536,042 | 8/1985 | Falconer | 384/2 |
| 4,626,708 | 12/1986 | Cooper | 307/441 |
| 4,806,027 | 2/1989 | Tomlinson et al. | 384/50 |
| 4,856,172 | 8/1989 | Ahmed et al. | 29/434 |
| 4,985,604 | 1/1991 | Tyebkhan | 200/503 |
| 5,198,740 | 3/1993 | Jacobsen et al. | 318/568.016 |
| 5,272,293 | 12/1993 | Abbin et al. | 200/61.53 |
| 5,302,886 | 4/1994 | Jacobsen et al. | 318/687 |

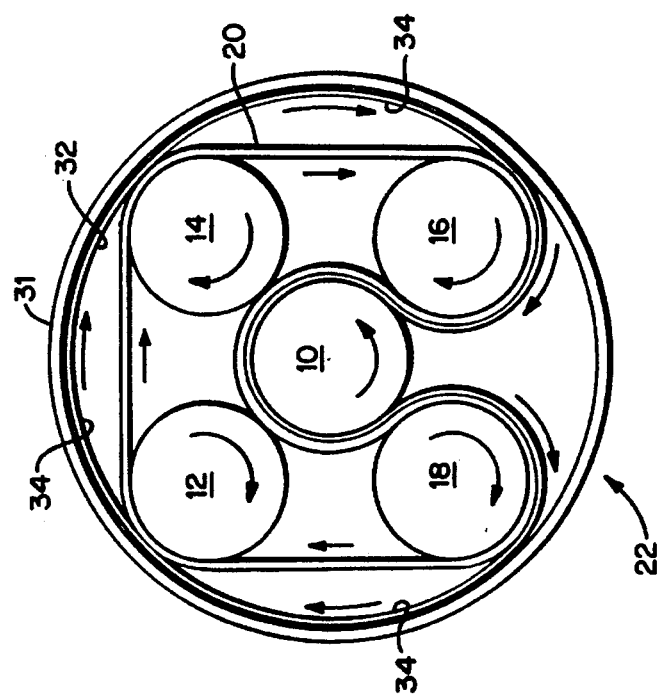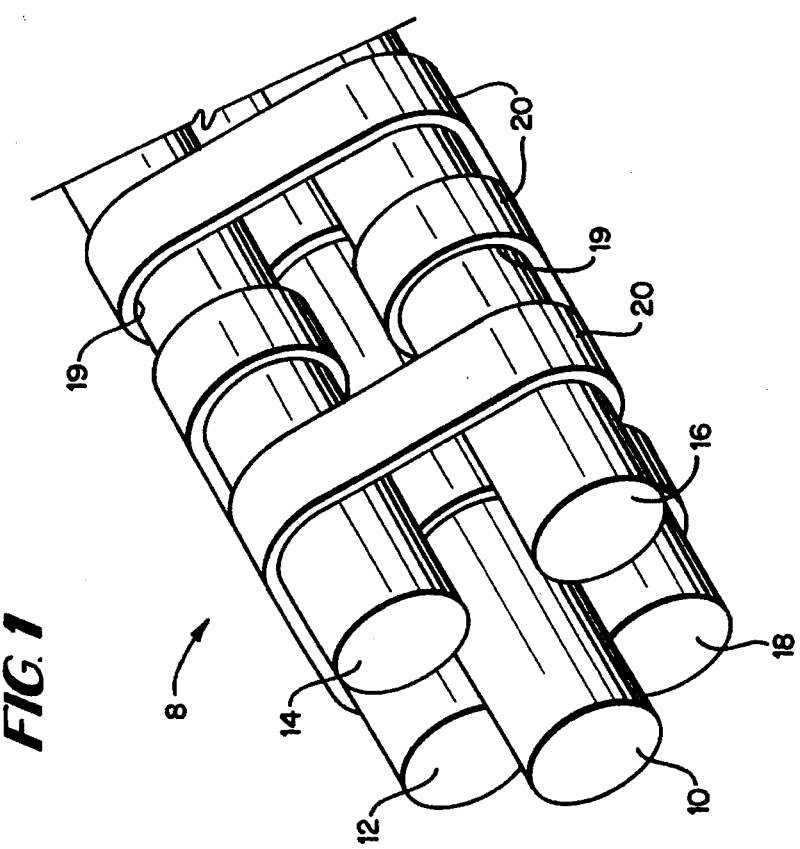

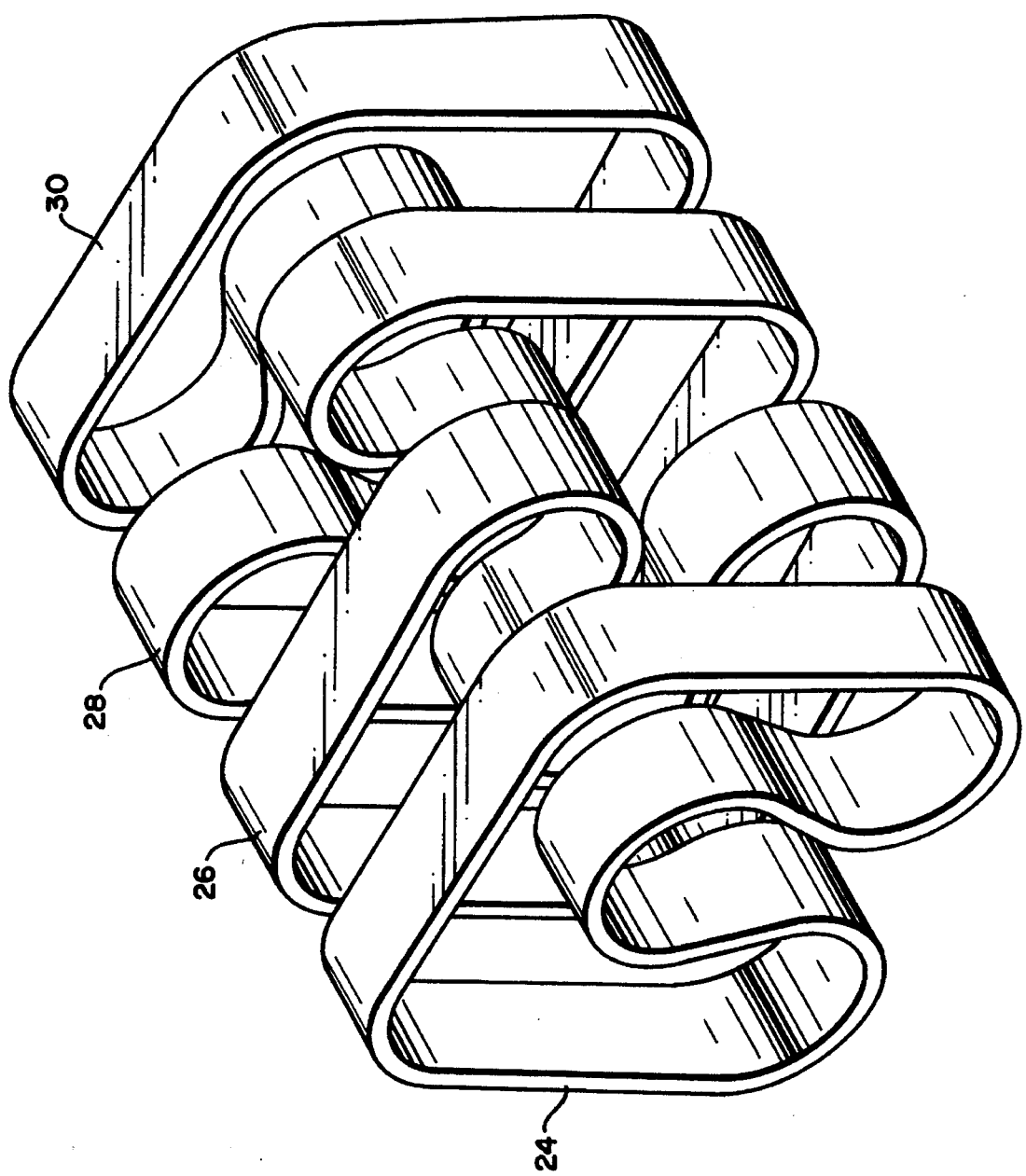

SCROLLER ROLLER BAND DEVICE

FIELD OF INVENTION

This invention relates to the field of mechanics, including rotary and linear mechanical devices. For example, this invention relates to the fields of low-friction bearings and other rotating devices.

BACKGROUND AND SUMMARY OF INVENTION

There is a long-felt need for low-friction rotating devices that require no or little lubrication. Since the first wheel, there has been a compelling need for reliable and low friction rotating bearings and other rotary devices. Prior rotary devices inherently produce friction as they convert one form of motion, e.g., rotation, into another form of motion, e.g., linear movement, or energy. Prior rotary devices, such as roller bearings, require lubrication to reduce friction and are prone to failure if not properly lubricated and maintained. In these prior devices, friction between two surfaces, such as a bearing surface and a roller bearing, degrade the efficiency of the device, and produce undesirable heat and wear that can damage the rolling surfaces, break down needed lubrication and reduce the useful life of the device. The lubrication required for most prior art rotary devices reduces the operating efficiency of the devices; must be filtered, replaced or shielded; limits the operating environment to conditions favorable to lubrication; traps dirt and grit, and necessitates seals and dust covers to protect the lubrication. In addition, these seals and dust covers contribute to friction losses. Furthermore, prior art rotary devices generally are manufactured to narrow tolerances that necessitate high degrees of manufacturing accuracy that make the manufacture of such devices expensive and difficult. The difficulties caused by high friction, lubrication and narrow manufacturing tolerances have plagued prior art rotary devices.

The lubricants needed for prior rotary devices degrade, trap particles between rotating surfaces and perform poorly in extreme conditions. Prior rotary devices are susceptible to dirt, grit and other debris suspended in the lubricant. Debris and grit caught between the contacting surfaces in a conventional rotary device tends to gouge surfaces and cause seizure of the rotating elements of the device. Similarly, extreme operating conditions, such as under water, weather exposure, in fire, dust and dirt and in outer space, generally render most conventional lubricants useless as such lubricants are not suitable for these extreme conditions. In addition, lubricants tend to degrade, evaporate or slide off surfaces during long term storage of rotary devices. Furthermore, rotary devices are not readily micro-miniaturized because of the difficulty in lubricating micro-machined components and because lubricants are generally not suitable for micro-miniaturized devices. In addition, friction—and the lack of accuracy in micro-manufacture techniques—pose problems that are difficult to overcome in the micro-miniaturization of rotary devices. Accordingly, extreme conditions, long term storage and micro-miniaturization are examples of circumstances where conventional rotary devices have failed to perform as needed.

Nearly twenty years ago, an oscillating (non-rotary) roller band device was invented by Donald F. Wilkes at Sandia Laboratories that came to be known as a "rolamite" device. This rolamite device is described in U.S. Pat. No. 3,452,175, entitled "Roller Band Device," that issued Jun. 24, 1969. The rolamite device included a guide housing having two or more rollers and an S-shaped flexible band that looped around each roller. The band and the housing constrained the movement of the rolling shafts to effect the desired oscillating movement. Mr. Wilkes further described his roller band device in a report entitled "Rolamite: A New Mechanical Design Concept" (Research Report SC-RR-67-656A) printed in December 1967 by Sandia Laboratories. This report describes several embodiments of the roller band device.

Mr. Wilkes received substantial publicity for his roller band device in the late 1960's. Several articles on roller band devices were published in popular technical journals that heralded Mr. Wilkes and his invention. Indeed, one of these articles reported that the rolamite device was the twenty-sixth fundamental mechanism of all time and the first fundamentally new fundamental mechanism since the clutch invented before 1814. See "Popular Mechanics," p. 95 (February 1968).

The roller band device developed by Mr. Wilkes has never achieved wide-spread commercial use. There are limited applications of roller band devices in weapons and crash sensors where oscillating movement is required. But, these applications of oscillating devices do not represent the wide use enjoyed by roller-bearings and other every day rotary devices. A fundamental limiting feature of the rolamite device is that it provides oscillation, but does not effectively provide rotation. A large portion of all mechanical devices rely on rotation to transfer energy and motion. Indeed, roller bearings, cams, gears and many other common devices apply rotation.

Despite several prior attempts over 27-years to develop effective and practical rotary roller band devices, no practical rotary roller band device was developed, until the present invention. In this regard, Mr. Wilkes wrote that "only a few rotary rolamite devices have been modeled. Most of these models exhibited good oscillatory performance, but with all of them continuous rotation resulted in band failure." D. F. Wilkes, "Rolamite: A New Mechanical Design Concept", Research Report SC-RR-67-656A, p. 179 (Sandia Labs. December 1967). It is believed that prior rotary roller band devices failed principally due to band failure caused by rubbing between adjacent bands, and to unwanted sliding between the bands and band guideways resulting from inadequate contact between the bands and guideways.

Of the many other patents that have issued on roller band devices, only U.S. Pat. No. 3,691,871 issued to Dean Gladow et al. in 1972 was found that discloses a rotary motion roller band device. The Gladow patent discloses a complicated arrangement of rollers having a central roller and three orbiting roller pairs. The. roller pairs orbit the central roller and ride against an annular guide surface. A roller band holds these three layers of rollers together. The rotary device disclosed in the Gladow patent is believed to have inadequate stability of the orbiting roller pairs and insufficient contact between the orbiting roller pairs and outer annular guide surface. Accordingly, there has been a long-felt need in the art for a rotary roller band device and several technical failures to achieve such a device.

The present invention is a novel and unobvious rotary roller band device that solves the prior problems of band failure of prior rotary roller band devices. The invention provides rotary motion with minimal friction and slippage between bands and rollers. Whereas prior roller band devices require three elemental components (rollers, bands and housing), the current invention has just two elemental components which are rollers and bands. With just two components, the invention is self-supporting and does not require a housing to hold the rollers and bands together as do prior roller band devices. The current invention embodies a new mechanical geometry previously unknown that is elegant in the simplicity of just two elemental components. The unique geometry of the invention is inherently stable in that its novel combination of rollers and bands is self-supporting and self-aligning, and employs unique geometric methods of operation in the manner that the bands weave through the rollers during rotation.

In particular, the current invention in one embodiment is a central roller concentric to an array cluster of outer counter-rollers that freely rotate about the central roller. The rollers are interconnected by bands that weave around the central roller and outer orbiting rollers. The bands are flexible and hold the rollers snugly in parallel and constrain the rolling movement of the rollers such that the outer rollers orbit the central roller. As the rollers rotate, the bands move in endless loops between and around the rollers. The surfaces of the bands are in a low-friction rolling engagement with the rotating surfaces of the rollers.

A particularly novel feature of the invention is that the bands are arranged such that the outer orbiting rollers are disposed within the loops of the roller bands and roll against the inside surface of the bands. The central roller is disposed outside of the loops formed by the bands and the central roller rolls against the outside surface of the bands. The band loops are each held in a C-shape where the cup (inside) of the "C" receives the central roller in a self-supporting nesting arrangement. Accordingly, the band wraps around most but not all of the circumference of the central roller and, thus, the band has virtually slip-free contact with the surface of the central roller.

The orbiting outer rollers are inside the loops of the roller bands. Of the orbiting outer rollers in the C-shaped loop, two adjacent outer rollers form the ends of the "C". The band curves around more that one-half of the circumference of each of these two outer rollers. Because the band wraps tautly around these two outer rollers at the ends of the "C", these outer rollers are held securely by the bands at these taut loop ends. At least one band wraps around each of the orbiting rollers because the orientation of the C-shaped loop of the different bands is shifted (off set) from band to band. In this manner, the orbiting rollers are held parallel to the central roller because of the support imparted by at least one band that wraps without slippage around more than one-half of the circumference of the roller in a row. Moreover, the outer rollers are also forced inward towards the central roller by the bands that pass over the outer roller, but do not wrap around the roller as happens to the rollers at the ends of the "C" of the roller band loops.

It is an object of this invention to provide a rotary mechanical device having low-friction rolling contact between elements in contact, and that avoids high-friction rubbing and sliding contact between elements. It is another object of this invention to provide rotating mechanical devices that have relatively low coefficients of friction and do not require lubricants.

Another object of this invention is to provide a mechanism that is extremely tolerant of surface irregularities and imperfections. The rotating members and bands readily roll over small foreign particles, such as dust or grit, without jamming and can tolerate deforming pressures on rotating load bearing surfaces of the rotary device.

In addition, the invention provides inherent directional insensitivity, e.g., remains in balanced self-alignment, along the longitudinal axis of the rotary motion. In this regard, the invention is insensitive to extraneous side loads and other forces because the forces between the bands and rolling members counteract and balance the extraneous side loads. Similarly, the geometry of the invention inherently provides good side load bearing capability as the side load components act parallel to the roller axes and, thus, can be borne without increasing friction in the device. Moreover, abnormally high forces, side loads and torques of unpredictable, infrequent or sporadic nature can be borne by the invention due to the balanced forces acting on the flexible bands and rollers, and between rollers. Accordingly, the invention is well suited to heavy load bearing applications.

A further object of this invention is to provide a device wherein the costs of manufacturing are minimal as compared to the costs of manufacturing other rotary devices. The device is extremely tolerant to minor imperfections in its own geometry and, thus, allows for wide tolerances in production controls and in minor dimensional aberrations and inaccuracies. Because the invention allows for wide tolerances in manufacture, its manufacturing cost should be significantly lower than the costs of manufacturing precision bearings. Furthermore, the large tolerances offered by the invention are helpful for micro-miniaturized devices. In addition, the invention may be constructed of standardized modular parts that can be easily configured to various applications. Indeed, the modularity of the invention provides a wide range of functional results with only minor variations in construction, allowing for time and cost savings, adaptive manufacturing methods in which the tooling for a single assembly line can be readily modified during production to adapt to different manufacturing or product requirements. Minor modular modifications in the invention can yield products having major functional differences.

In one embodiment, the invention is a rotary roller band device that comprises a central rotating element and a plurality of orbiting rotating elements concentrically arranged around the central rotating element. A row of bands is intertwined between the rotating elements, each band is held in a C-shaped loop disposed partially around each of the rotating elements, the bands are flexible and held taut by the rotating elements, and the bands hold the elements in parallel. The orbiting elements rotate counter to the central rotating element, and the elements roll within the bands which move in endless loops.

In another embodiment the invention is a rotary device comprising a central roller, at least three outer rollers orbiting and concentric to the central roller, and a plurality of bands in a row each forming a loop having an inside surface and an outer surface. Each of the bands are disposed around the central roller such that the outer surface of the band loop is in rolling contact with the central roller, and the outer rollers are disposed in the band loop such that the outer rollers are in rolling contact with the inside surface of the loop.

The invention also comprises a method for creating low friction rotational motion with a rotary device having a central element, orbiting elements and roller bands that includes the steps of: positioning a plurality of orbiting rotating elements concentrically around a central element; weaving a row of roller bands between the rotating elements, holding each band in a C-shaped loop disposed partially around each of the rotating elements wherein each loop is offset with respect to other loops, and wherein the bands are flexible and provide stable support to the rotating elements;

holding the orbiting elements parallel to the central element with the bands, and rotating the orbiting elements counter to the rotation of the central element and rotating the elements with the bands that move in endless loops.

These objects, and others, are attained by the invention described in a preferred embodiment below.

BRIEF DESCRIPTION OF THE DRAWINGS

FIG. 1 is a perspective view of a first embodiment of the invention;

FIG. 2 is an end view of a second embodiment of the invention;

FIG. 4 is a perspective view of four roller bands isolated from their rollers and other components to illustrate band offset.

DETAILED DESCRIPTION OF THE DRAWINGS

Figure 5:
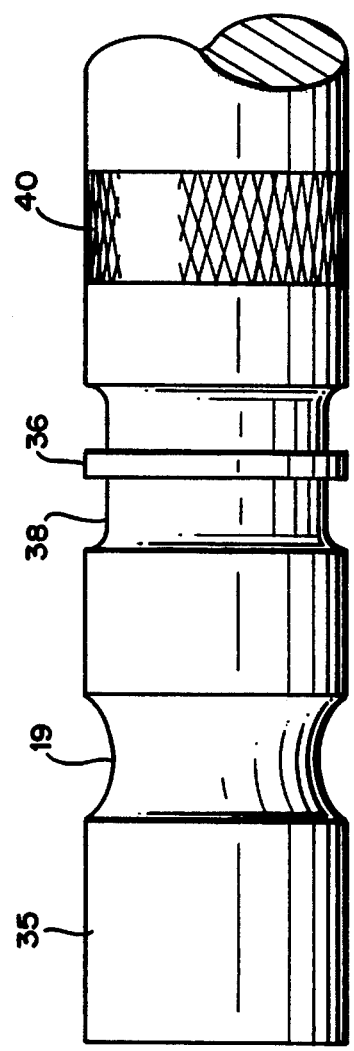
FIG. 5 is a side view of an exemplary roller exhibiting several different band guide slots.

FIG. 1 shows a rotary roller band device 8 having a central cylindrical roller 10 symmetrically surrounded by four outer orbiting cylindrical rollers, 12, 14, 16 and 18. The number of outer orbiting rollers will depend upon the particular application, but generally it is believed that at least three outer rollers are required for practical operation of a rotary roller band device. Each roller may have a series of annular guide grooves 19 which receive and hold in place the roller-bands 20 that hold the device together. In some embodiments, each band (20) may roll in side-to-side contact with adjacent bands in the row.

The rollers are in the exemplary embodiment, shown in FIG. 1 as round in cross section and having uniform diameters. In other embodiments, one or more of the rollers may be out of round, such as having oval, cam-shaped or flat-sided cross sections. Similarly, one or more of the orbiting rollers may have a cross-sectional area that is substantially different than that of the central roller. In addition, the rollers may be magnetic so as to generate self-supporting forces between the rollers.

Roller bands 20 hold the rollers together. Several flexible roller-bands weave in rows of endless loops between the roller-shafts and support the rollers in their cluster arrangement. In some embodiments, the roller-bands have sufficient thickness to physically separate the rollers and the bands serve as the rolling surfaces between the rollers. In other embodiments, the orbiting shafts roll against the central shaft and bands. The roller-bands are held taut in the rotary roller band device 8 to constrain the movement of the rollers to the desired orbiting motion. In addition, the support of the bands holds the rollers in parallel because the band tension is minimal and balanced when the orbiting rollers are parallel and symmetrically arranged around the central roller. Accordingly, the bands should be uniformly snug to ensure that a uniform balanced support is applied by the bands to the rollers. Furthermore, some of the support provided by multiple bands can alternatively provide a magnetic force relationship between magnetic rollers. With magnetic rollers, the polarity of the central roller is opposite to that of the orbiting rollers.

Figure 3:
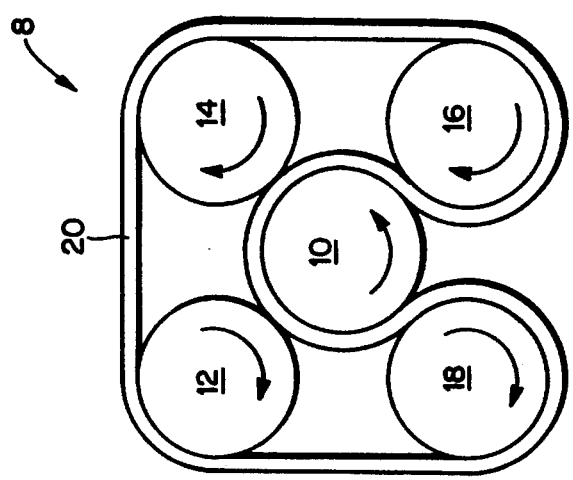
FIG. 3 is an end view of the first embodiment of the invention.

As best shown in FIGS. 2 and 3, each roller-band extends around the rotary roller band device 8 (device 22 in FIG. 2) and bows inward around the central rollers to form a substantially C-shaped loop. The central roller engages the outer surface of the band loop 20 and the orbiting rollers inside the loop engage the inside surface of the bands. Because of this C-shaped arrangement, each band loops around more than one-half of the circumference of the central roller 10. Accordingly, each roller-band is in a high degree of surface-to-surface contact with a substantial portion of the central roller. This surface-to-surface contact ensures that the traction between the central roller and roller-band is sufficient to avoid unwanted slippage between the band and roller.

Similarly, each band loops around more than one-half of the circumference of two adjacent orbiting rollers, e.g., 16, 18, that are disposed at the ends of the "C" of the band loop. In any particular band, the orbiting rollers at the ends of the "C" in the band loop are held parallel to each other and the central roller by that band and other bands in which those rollers are at the ends of the "C". The orbiting rollers inside the loop, but not at the ends of the "C", are pulled inward towards the central roller by the tautness of the loop. Accordingly, the cooperation of all of the bands provide the needed balanced support and self-alignment to hold each orbiting roller in place.

There are a plurality of bands 20 in the rotary roller band device. Preferably, the number of bands is at least twice the number of orbiting outer-rollers. However, fewer bands may be employed if magnetic rollers are used. The bands are arranged so that they are offset to one another in the rotary roller band. As discussed above, each band forms a C-shape as it loops around two adjacent orbiting rollers and between those two rollers loops-backwards around the central roller. If each band looped around the same two orbiting rollers, there would be no force to hold the central roller in the middle of the cluster of orbiting rollers. Accordingly, the orientations of the C-shaped bands are off-set from one another such as is shown in FIG. 4, which shows off-set bands 24, 26, 28 and 30. FIG. 4 illustrates that the bands are offset from one another, but does not show all eight bands that would preferably be used with four orbiting rollers. Moreover, the offset pattern of the bands may vary depending on the application. As shown in FIG. 4, the C-shape of each band is offset by 90 degrees from adjacent bands such that the C-shape of adjacent bands rotates clock-wise from left to right in FIG. 4.

The roller bands engage the rollers in a slip-free rolling movement that allows the rollers to rotate easily and with minimal friction, while being constrained by the bands. Each roller band 20 is in rolling contact with all of the rollers in the rotary roller band device 8. Preferably, the bands do not slip with respect to the rollers to reduce friction and wear of the bands and rollers.

In one application of the device, as shown in FIG. 2, the rotary roller band device rotates within an outer bearing surface 31. This bearing surface need not be polished or lubricated as do bearing surfaces in roller bearings. Indeed, the rollers, bands or guide surfaces may be etched to provide better traction for certain conditions, such as wetness. Within the bearing surface, the central roller 10 is concentric to the outer bearing surface and the outer rollers, 12, 14, 16 and 18, orbit and counter-rotate around the central roller. The outer roller bands 32 are in rolling contact with the bearing surface, as well as the inner roller band assembly, and in particular, the inner roller bands. Because of the substantial rolling contact, virtually no friction is generated as the bands roll against the outer bearing surface and loop through the rotating rollers.

Outer roller band 32 of roller band device 22 may superimpose over each roller band 20. The outer roller band (or bands) moves in conjunction with the inner roller bands 20 and loops between the rollers in the same manner as do the inner bands. The outer roller band may be formed of spring steel or other springy, spongy, inflatable or magnetic material such that the outer band bows out to form an array of convex surfaces 34 that press into firm rolling engagement with more than one-half of the outer bearing surface 31 to provide traction between the rotary roller band device and bearing surface. For example, the outer band may be inflated with a fluid. The fluid will tend to fill and bow the sections of the outer bands between the rollers. The inner roller band is the flexible band material discussed above and these rows of bands support and constrain the rollers together in the cluster arrangement.

As shown in FIG. 5, each roller 35 may include an annular element to receive and engage the roller band. For example, a groove 19 in the roller having a smooth concave surface constrains the roller band in the groove and centers the band within the groove as the band rolls over the groove. Appropriate roller bands for such a groove include tubes, cables, and woven materials that seat in the groove. Similarly, a roller band tube 20 may be inflatable, fluid filled or formed of a spongy material, to provide roller separation and a cushion between the rollers. Alternatively, an annular rib 36 in an annular groove 38 on a roller may be used to support the middle of a roller band and center the band over the rib 36. In addition, the rollers in an annular area for the roller bands may be scored in a cross-hatched pattern (40) to provide good traction between the band and rollers, especially in wet conditions where traction may be difficult to maintain.

The rotary roller band device has many other applications including as a low friction, lubricant free bearing such as for a bicycle, as a cam in which the outer shafts orbit about a cam-shaped central roller or in which the central roller orbits about a cam-shaped outer roller, as a clutch or slip differential in which the central roller changes diameter to engage and disengage the roller bands, as a rotary speed changer, as a track wheel in which the bands roll along a surface to move the central roller linearly over the surface, and as a stair climber in which flat sided shafts, e.g., triangular, walk-up stairs. Because the invention can be used to fulfill various functional requirements, it can be employed in multiple functional capacities as various components in a single system or device. Of course, the invention is suitable for a wide variety of other applications requiring a rotary device.

The invention has been described in what is presently considered to be the most practical and preferred embodiment. The invention is not limited to the disclosed embodiment. Instead, the invention covers the various modifications and equivalent arrangements included within the spirit and scope of the appended claims.

What is claimed is:

1. A rotary roller band device comprising:

a central rotating element and a plurality of orbiting rotating elements concentrically arranged around said central rotating element;

a row of bands each intertwined between said rotating elements, each band held in a C-shaped loop disposed partially around each of said rotating elements, said band being flexible and held taut by said rotating elements, and said band holding said elements in parallel, wherein said orbiting elements rotate counter to said central rotating element, and said elements roll within said bands which move in endless loops.

2. A rotary roller band device as in claim 1 wherein said central rotating element is a cylinder.

3. A rotary roller band device as in claim 2 wherein said central rotating element includes annular grooves which cooperate with said bands.

4. A rotary roller band device as in claim 1 wherein said orbiting rotating elements are cylinders.

5. A rotary roller band device as in claim 4 wherein said orbiting rotating elements include annular grooves which cooperate with said bands.

6. A rotary roller band device as in claim 1 further comprising a plurality of outer bands superimposed over said roller bands.

7. A rotary roller band device as in claim 6 wherein said outer bands bow outwardly.

8. A rotary roller band device as in claim 6 wherein said outer bands are fluid filled.

9. A rotary roller band device as in claim 6 wherein said outer bands are magnetic.

10. A rotary roller band device as in claim 6 further comprising an outer bearing sleeve having an inner circumference in rolling contact with said outer bands.

11. A rotary device comprising:

a central roller and at least three outer rollers orbiting and concentric to said central roller, and a plurality of bands in a row each forming a loop having an inside surface and an outer surface, each of said bands disposed around said central roller such that said outer surface of said loop is in rolling contact with said central roller, and each of said outer rollers disposed in the loop of each band such that said outer rollers are in rolling contact with said inside surface of said loop.

12. A rotary device as in claim 11 wherein the plurality of bands is at least six bands.

13. A rotary device as in claim 11 wherein said rollers are magnetic, and said orbiting rollers are magnetically attracted to a central roller.

14. A rotary device as in claim 13 wherein the central roller is polarized magnetically opposite that of the orbiting rollers.

15. A rotary device as in claim 11 wherein said central roller and outer rollers are cylinders.

16. A rotary device as in claim 11 wherein said roller bands are flexible and hold said rollers snugly.

17. A rotary device as in claim 11 further comprising an outer bearing surface around said device wherein said outer surface of said bands are in rolling contact with said bearing surface.

18. A rotary device as in claim 17 further comprising an outer roller band superimposed over each of said roller bands wherein said outer roller band bows outward against said bearing surface.

19. A rotary device as in claim 11 wherein each of said roller bands form a C-shaped loop and each of said C-shaped loops is offset with respect to another loop.

20. A method for creating low friction rotational motion with a rotary device having a central element, orbiting elements and roller bands, comprising the steps of:

(a) positioning a plurality of orbiting rotating elements concentrically around a central element;

(b) weaving a row of roller bands between the rotating elements, (c) holding each band in a C-shaped loop disposed partially around each of the rotating elements wherein each loop is offset with respect to another loop, and wherein the bands are flexible and provide stable support to the rotating elements;

(d) holding the orbiting elements parallel to the central element with the bands, and (e) rotating the orbiting elements counter to the rotation of the central element and rotating the elements with the bands that move in endless loops.

21. A method as in claim 20 wherein step (e) further comprises orbiting the orbiting elements about the central element.

22. A method as in claim 20 wherein step (e) further comprises orbiting all but one of the orbiting elements and the central element about the remaining orbiting element.

23. A method as in claim 20 wherein said rotary device further includes an outer band superimposed over at least one of the roller bands and further comprises step (f) rotating the device with the outer band in rolling contact with an exterior surface.

* * * * *